United States Patent
Hamada et al.

(12)

(10) Patent No.: US 6,462,159 B1
(45) Date of Patent: Oct. 8, 2002

(54) CATIONIC DEPROTEINIZED NATURAL RUBBER LATEX, METHOD OF PREPARING THE SAME, AND TREATING AGENT USED IN THE METHOD

(75) Inventors: Akihiko Hamada, Kakogawa (JP); Naoya Ichikawa, Himeji (JP); Masaharu Hayashi, Tokyo (JP)

(73) Assignees: Sumitomo Rubber Industries, Ltd, Kobe (JP); Kao Corporation, Tokyo (JP)

( * ) Notice: Subject to any disclaimer, the term of this patent is extended or adjusted under 35 U.S.C. 154(b) by 0 days.

(21) Appl. No.: 09/657,816

(22) Filed: Sep. 8, 2000

(30) Foreign Application Priority Data

Sep. 10, 1999 (JP) .......................................... 11-257562

(51) Int. Cl.$^7$ ............................................. C08F 112/34
(52) U.S. Cl. ........................ 526/336; 526/335; 528/488; 528/492; 528/932; 528/934; 524/575.5
(58) Field of Search ................................. 526/335, 336; 528/932, 488, 934, 492; 524/575.5

(56) References Cited

U.S. PATENT DOCUMENTS 4,675,347 A * 6/1987 Mochizuki et al. ......... 523/122

FOREIGN PATENT DOCUMENTS

| EP | 0584597 A | * | 2/1994 | ............. C08C/1/04 |
|---|---|---|---|---|
| JP | A656904 | | 3/1994 | |
| JP | A656905 | | 3/1994 | |
| JP | A656906 | | 3/1994 | |
| JP | 9025468 | | 1/1997 | |
| JP | 10259360 | | 9/1998 | |

OTHER PUBLICATIONS

A.D. Roberts, "Natural Rubber Science and Technology", pp. 94–95, (1988).

* cited by examiner

*Primary Examiner*—James J. Seidleck
*Assistant Examiner*—Melanie Bissett
(74) *Attorney, Agent, or Firm*—Birch, Stewart, Kolasch & Birch, LLP

(57) ABSTRACT

Disclosed are a cationic deproteinized natural rubber latex, in which rubber particles are positively charged and the concentration of said rubber particles is from 40 to 65% by weight and that the viscosity at 25° C. of said latex is 200 mPa·s or less, a method of preparing said latex which comprises subjecting to a deprotenization treatment using a proteolytic enzyme and a deproteinizing agent made of one or more surfactant selected from cationic and nonionic surfactants, and optionally adding a post additive comprising a cationic or nonionic surfactant as an active component, thereby to enable both surfactants described above to coexist, and a treating agent used in the same.

6 Claims, No Drawings

CATIONIC DEPROTEINIZED NATURAL RUBBER LATEX, METHOD OF PREPARING THE SAME, AND TREATING AGENT USED IN THE METHOD

BACKGROUND OF THE INVENTION

The present invention relates to a cationic deproteinized natural rubber latex and, more particularly, to a cationic deproteinized natural rubber latex suited to bond papers, fibers, cloths and hides, and a method of preparing the same.

Heretofore, natural rubber adhesives wherein the concentration of the rubber contained in a natural rubber latex is concentrated to about 60% have widely been used to bond papers, fibers, cloths and hides.

However, the natural rubber latex contains a protein as a non-rubber component other than the rubber component and the kind and amount of the protein vary depending on the producing district and producing season. Therefore, there arise problems such as scatter in quality and vulcanization characteristics of natural rubber adhesives as well as deterioration of qualities of natural rubber adhesives, for example, mechanical characteristics such as creep characteristics and aging resistance, and electrical characteristics such as insulating properties. There also arise problems that ammonia as a preservative is incorporated in the natural rubber latex to cause a strong odor.

Also there has recently been reported the case where a strong I type allergic symptom is caused by a protein in a natural rubber when using a natural rubber product.

A trial of solving these problems has been made by a method of efficiently removing a protein from a natural rubber latex disclosed in Japanese Published Unexamined patent (Kokai Tokkyo Koho Hei) Nos. 6-56904, 6-56905 and 6-56906. Such a method is capable of removing a protein by adding a proteolytic enzyme (protease) and an anionic or nonionic surfactant are added to a natural rubber latex, thereby to decompose a protein, and then a creamy rubber component is separated by a purification treatment such as centrifugation to remove the protein.

However, the surfactant used in the method of the publications described above is anionic or nonionic and rubber particles in the deproteinized natural rubber latex are negatively charged or in the state free from polarity.

Accordingly, it was not preferable to use, as an adhesive, such deproteinized natural rubber latex in the fibers or papers which are negatively charged when treated in water.

On the other hand, a cationic natural rubber latex incorporated with cetyltrimethylammonium bromide (CTAB) as a cationic surfactant is described in pages 94 to 95 of "Natural Rubber Science and Technology" (edited by A. D. Roberts, published by Oxford University Publication, 1988). As described in such a reference document, when a sufficient amount of the cat ionic surfactant is added to the natural rubber, a latex comprising rubber particles having cations can be obtained. The latex is made cationic in such way, thereby making it possible to improve the close adhesion with the fibers or papers which are negatively charged when treated in water.

However, the natural rubber latex disclosed in the reference documents described above has such a problem that the thickness of an adhesive layer formed by the rubber latex is liable to be decreased to obtain poor bonding strength when coated the adherend with the natural rubber latex, because the concentration of the rubber component is low such as about 30% by weight.

Furthermore, the latex obtained by merely incorporating the cationic surfactant in the natural rubber latex has a problem such as poor workability on coating because of large increase in viscosity with a lapse of time and fear of a solidification action.

Also in such a case, applications of the latex are limited because its use as a natural rubber adhesive is not preferable.

SUMMARY OF THE INVENTION

Thus, an object of the present invention is to provide a cationic deproteinized natural rubber latex which can maintain excellent storage stability and workability on coating even if the concentration of the rubber component is high, and which exhibits excellent adhesion to papers, cloths and hides and also has high safety to the human body.

Another object of the present invention is to provide a treating agent for obtaining a cationic deproteinized natural rubber latex which can maintain excellent storage stability and workability on coating even if the concentration of the rubber component is high, and which exhibits excellent adhesion to papers, cloths and hides and also has high safety to the human body.

The present inventors have intensively studied to solve the problems described above and found such a novel finding that, when rubber particles in the natural rubber latex subjected to the deproteinization treatment are positively charged, the viscosity can be reduced to a sufficiently low value even if the solid content concentration of the rubber particles is increased, thus obtaining a natural rubber latex which has excellent workability on coating for adhesive and has excellent adhesion to papers, fibers, cloths and hides. Thus, the present invention has been completed.

The cationic deproteinized natural rubber latex rubber particles of the present invention is characterized in that rubber particles are positively charged and the concentration of said rubber particles is from 40 to 65% by weight and that the viscosity at 25° C. (hereinafter referred merely to as "viscosity") of the latex is 200 mPa·s or less.

According to the cationic deproteinized natural rubber latex of the present invention, since the viscosity of the latex is maintained at a low value such as 200 mPa·s or less even if the concentration of the rubber particles (concentration of the rubber component in the latex) is a high value ranging from 40 to 65%, the workability on coating is good and an adhesive layer having a uniform thickness can be formed in case of coating the adherend. Accordingly, neither poor thickness nor unevenness does occur when the adhesive layer is formed, thereby making it possible to obtain a sufficient bonding strength.

The cationic deproteinized natural rubber latex according of the present invention is prepared by subjecting to a deproteinization treatment using a proteolytic enzyme and one or more surfactants selected from cationic and nonionic surfactants, and contains both cationic and nonionic surfactants after the treatment.

That is the cationic deproteinized natural rubber latex is characterized in that a protein in the natural rubber latex is removed by the deproteinization treatment using a deproteinizing agent containing a proteolytic enzyme and cationic and/or nonionic surfactants, and the cationic surfactant and nonionic surfactant finally coexists in the latex.

According to the cationic deproteinized natural rubber latex of the present invention, it is made possible to obtain a latex having excellent dispersion stability and storage stability, to maintain the viscosity of the latex at 200 mPa·s or less even in case of a so-called high-concentration latex having a rubber component in a concentration of more than 40% by weight, and to sufficiently prevent phenomenon such as increase in viscosity with a lapse of time, solidification or cohesion.

The cationic surfactant not only contributes to an improvement in dispersion stability and storage stability of the latex, but also exerts an action of making the latex cationic, i.e. an action of positively charge the rubber particles in the latex to form a suspension of the cation charged particles in water. As a result, the latex of the present invention exhibits excellent adhesion to papers, fibers, cloths and hides.

According to the effects described above, the cationic deproteinized natural rubber latex of the present invention exhibits excellent adhesion and excellent workability on coating for a base latex in a natural rubber adhesive suited to bond to papers, fibers, cloths and hides.

In the present invention, the protein contained in the natural rubber latex as the raw material is removed by the deproteinization treatment. As a result, the latex of the present invention prevents allergy caused by the protein and therefore has high safety to the human body.

The method of preparing a cationic deproteinized natural rubber latex of the present invention is characterized by subjecting a natural rubber latex to a deproteinization treatment using a proteolytic enzyme and one or more surfactant selected from cationic and nonionic surfactants, concentrating the deproteinized latex so that the concentration of a rubber component in the latex is within a range from 40 to 65% by weight, and incorporating at least the surfactant which was not incorporated on the deproteinization treatment among the cationic surfactant and nonionic surfactant.

According to the method of preparing a cationic deproteinized natural rubber latex of the present invention, there can be obtained a cationic deproteinized natural rubber latex which maintains the viscosity at 200 mPa·s or less even if the concentration of the rubber component is high such as 40 to 65% by weight, and which prevents an increase in viscosity with a lapse of time of the latex and also exhibits excellent storage stability.

The treating agent for cationic deproteinized natural rubber latex of the present invention is used to treat the natural rubber latex as the raw material so as to obtain the cationic deproteinized natural rubber latex of the present invention, and it includes:

(1) a treating agent for cationic deproteinized natural rubber latex, comprising (A) a deproteinizing agent containing at least a proteolytic enzyme and one or more cationic surfactants as an active component, and (B) an additive containing at least one or more nonionic surfactants as an active component which is added after treatment according to said deproteinizing agent;

(2) a treating agent for cationic deproteinized natural rubber latex, comprising (A) a deproteinizing agent containing at least a proteolytic enzyme and one or more nonionic surfactants as an active component, and (C) an additive containing at least one or more cationic surfactants as an active component which is added after treatment of said deproteinizing agent; or (3) a treating agent for cationic deproteinized natural rubber latex, comprising at least a proteolytic enzyme, one or more cationic surfactants and one or more nonionic surfactants as an active component.

According to the treating agent of the present invention, it is made possible to positively charge rubber particles in the latex and to maintain the viscosity of the latex at a low viscosity such as 200 mPa·s or less even if the concentration of the rubber component is adjusted to high concentration such as 40 to 65% by weight, thus making it possible to obtain a cationic deproteinized natural rubber latex which prevents an increase in viscosity with a lapse of time of the latex and also exhibits excellent storage stability.

Mode for Carrying out the Invention

The present invention will be described in detail below.

Cationic Deproteinized Natural Rubber Latex

The cationic deproteinized natural rubber latex of the present invention is a deproteinized natural rubber latex comprising cationic rubber particles, which is adjusted so that the viscosity of the latex is 200 mPa·s or less when the concentration of the rubber component is within a range from 40 to 65% by weight.

Cationic latex, i.e. positively charged rubber particles in the latex increases the affinity for papers, cloths and hides which are liable to be negatively charged in water, thereby enhancing the bonding strength.

The concentration of the rubber component in the cationic deproteinized natural rubber latex of the present invention is adjusted within a range from 40 to 65% by weight to exhibit excellent workability on coating for a base latex of a natural rubber adhesive.

When the concentration of the rubber component is lower than40% by weight, it becomes impossible to obtain a sufficient bonding strength for the base latex of the adhesive when using as the natural rubber adhesive. On the other hand, when the concentration of the rubber component exceeds 65% by weight, it becomes difficult to adjust the viscosity of the latex to 200 mPa·s or less, thereby causing such problems that the workability on coating is lowered when using as the natural rubber adhesive, or the dispersion stability and storage stability of the latex are lowered.

The concentration of the rubber component is preferably from 45 to 65% by weight, and more preferably from 45 to 60% by weight, within the range described above.

(Physical properties of cationic deproteinized natural rubber latex)

The viscosity of the latex is 200 mPa·s or less, preferably 100 mPa·s or less, and more preferably within a range from 20 to 100 mPa·s or less, when the concentration of the rubber component is within a range from 40 to 65% by weight.

The upper limit of the viscosity must be maintained until coating. When the viscosity of the latex on coating exceeds 200 mPa·s, the workability on coating is lowered. In this case, since formation of bubbles in the latex is accelerated, a uniform adhesive layer can not be obtained, thus causing problems such as lowering of the bonding strength. The lower limit of the viscosity is not specifically limited, and may be appropriately adjusted as far as it is free from such a problem that the workability on coating is lowered because of too high fluidity of the latex.

Raw Material of Cationic Deproteinized Natural Rubber Latex)

As the latex which is a starting material to obtain the cationic deproteinized natural rubber latex of the present invention, there can be used conventionally known various natural rubber latexes such as ammonia-retaining concentrated natural rubber latex (concentration of rubber component: about 60%) and field latex (concentration of rubber component: about 30%) collected from rubber trees.

Deproteinization Treatment

In case the cationic deproteinized natural rubber latex of the present invention is prepared, as described herein after, a natural rubber latex as the starting material is subjected to a deproteinization treatment composed of a treatment of decomposing a protein and a treatment of purifying by removing a non-rubber component such as decomposed protein.

The proteolytic enzyme used to subject the natural rubber latex to a deproteinization treatment is not specifically limited and a conventionally known one can be used, and examples thereof include alkaline protease. The protease may be derived from any of bacteria, filamentous bacteria and yeast, and the protease is preferably derived from bacteria, particularly preferably from the genus Bacillus. It is also possible to use enzymes such as lipase, esterase, amylase, lacase and cellulase in combination.

As the proteolytic enzyme used in the present invention, or example, protease KAP having a resistance to the surfactant manufactured by Kao Corp. is used particularly preferably among the enzymes described above.

When using alkaline protease as the proteolytic enzyme, its activity [measured value obtained by modification of the Anson-hemoglobin method (Anson. M. L. J. Gen. Physiol., 22, 79(1938)] is within a range from 0.1 to 50 APU/g, and preferably within a range from 1 to 25 APU/g.

The amount of the proteolytic enzyme to be added is preferably set within a range from 0.0001 to 20 parts by weight, and more preferably within a range from 0.001 to 10 parts by weight, based on 100 parts by weight of the rubber component of the natural rubber latex. When the amount of the proteolytic enzyme is within the range described above, a protein in the latex can be sufficiently decomposed and the activity of the enzyme is retained, thereby making it possible to effectively exert the effect corresponding to the addition. Therefore, it is advantageous in view of the cost. In case the enzyme is added, pH adjustors such as disodium hydrogen phosphate and other additives may be added.

Surfactant

In case the cationic deproteinized natural rubber latex of the present invention is prepared, (i) for the purpose of stably dispersing a rubber component in a latex on decomposition of a protein, and (ii) for the purpose of improving the dispersion stability and storage stability of the latex and positively charging rubber particles in the latex to form a suspension of cation charged particles in water, one or more cationic surfactants and one or more nonionic surfactants as a stabilizer are used in the latex.

Examples of the cationic surfactant used in the present invention include alkylamine salt, alkylamine derivative and quaternized compound thereof.

Examples of the alkylamine salt include, but are not limited to, salts of primary amine, secondary amine and tertiary amine. Examples of the salt include hydrochloride, phsophate, actate, alkyl sulfate, alkylbenzenesulfonic acid, alkylnaphthalenesulfonic acid, fatty acid, organic acid, alkyl phosphate,alkyl ether carboxylic acid, alkylamide ether carboxylic acid, anionic oligomer, and anionic polymer.

The alkylamine derivative has at least one of an ester group, an ether group and an amide group in a molecule and examples thereof include polyoxyalkylene (AO) alkylamine and a salt thereof, alkyl ester amine (including AO adduct) and a salt thereof, alkyl ether amine (including AO adduct) and a salt thereof, alklyamideamine (including AO adduct) and a salt thereof, alkyl ester amideamine (including AO adduct) and a salt thereof, and alkyl ether amideamine (including AO adduct) and a salt thereof. Examples of the salt include hydrochloride, phosphate, acetate, alkyl sulfate, alkylbenzenesulfonic acid, alkylnaphthaleensulfonic acid, fatty acid, organic acid, alkyl phosphate, alkyl ether carboxylic acid, alkylamide ether carboxylic acid, anionic oligomer, and anionic polymer.

Specific examples of the acetate include coconutamine acetate and stearylamine acetate.

The alkyl group in the alkylamine salt and alkylamine derivative usually includes, but is not limited to, straight-chain, branched or Guerbet-shaped alkyl groups having 8 to 22 carbon atoms Examples of the quaternized compound of the alkylamine salt and alkylamine derivative include those prepared by quaternizing the alkylamine salt and alkylamine derivative with methyl chloride, methyl bromide, or dimethylsulfuric acid.

The quaternary ammonium salt includes, for example, those having a $C_{8-22}$ alkyl group and, more specifically, it includes, for example, alkyltrimethylammonium halide such as lauryltrimethylammonium halide, cetyltrimethylammonium halide, or stearyltrimethylammonium halide; dialkydimethylammonium halide such as distearyldimethylammonium halide; trialkylmethylammdnium halide; dialkylbenzylmethylammonium halide; or alkylbenzyldimethylammonium halide.

Among the cationic surfactants described above, cetyltrimethylammonium chloride (CTAC) and stearyltrimethylammonium chloride are preferably used in the present invention because of particularly excellent effect of stabilizing the latex.

The content of the cationic surfactant is set in both of a deproteinizing step described hereinafter and a subsequent post-adding step so that the content of the cationic surfactant can be adjusted within a range from 0.5 to 20% by weight based on the rubber component of the latex.

When the content of the cationic surfactant is within the above range, the cationic surfactant is sufficiently adsorbed in the rubber particles of the latex and low moisture-absorption properties of the solid rubber is retained on drying of the latex, thereby making it, possible to effectively exert the effect corresponding to the amount. Therefore, it is advantageous in view of the cost.

The nonionic surfactant used in the present invention includes, for example, polyoxyalkylene ether surfactant, polyoxyalkylene ester surfactant, polyhydric alcohol fatty ester surfactant, saccharide fatty ester surfactant, or alkyl polyglycoside surfactant.

The polyoxyalkylene ether surfactant includes, for example, polyoxyalkylene alkyl ether, polyoxyalkylene alkyl phenyl ether, polyoxyalkylene polyol alkyl ether, or polyoxyalkylene mono-, di- or tristyryl phenyl ether. The polyol includes, for example, polyhydric alcohols having 2 to 12 carbon atoms, such as propylene glycol, glycerin, sorbitol, glucose, sucrose, pentaerythritol, and sorbitan.

The polyoxyalkylene ester surfactant includes, for example, polyoxyalkylene fatty ester or polyoxyalkylene alkyl rosinate.

The polyhydric alcohol fatty ester surfactant includes, for example, fatty ester of polyhydric alcohol having 2 to 12 carbon atoms, or fatty ester of polyoxyalkylene polyhydric alcohol. More specifically, it includes sorbitol fatty ester, sorbitanfattyester, glycerinfattyester, polyglycerinfatty ester, or pentaerythritol fatty ester. In addition, polyalkylene oxide adducts thereof (e.g. polyoxyalkylene sorbitan fatty ester, polyoxyalkylene glycerin fatty ester, etc.) can also be used.

The saccharide fatty ester surfactant includes, for example, fatty acid esters of sucrose, glucose, maltose, fructose, and polysaccharides. In addition, polyalkylene oxide adducts thereof can also be used.

The alkyl polyglycoside surfactant includes, for example, alkyl glucoside, alkyl polyglucoside, polyoxyalkylene alkyl glucoside, polyoxyalkylene alkyl polyglucoside, or fatty acid esters thereof. In addition, polyalkylene oxide adducts thereof can also be used.

In addition, polyoxyalkylenealkylamine or alkylalkanolamide can be used.

The alkyl group in the nonionic surfactant includes alkyl groups having 4 to 30 carbon atoms. The polyoxyalkylene group includes those having a $C_{2-4}$ alkylene group, for example, those wherein the number of ethylene oxide is within a range from about 1 to 50 moles. The fatty acid includes, for example, straight-chain or branched, saturated or unsaturated fatty acids having 4 to 30 carbon atoms.

Among the nonionic surfactants described above, the polyoxyalkylene ether surfactant such as polyoxylene alkyl phenyl ether having a large effect of stabilizing the latex is preferable, and those having a hydrophile-lipophile balance (HLB) of 10 or more are more preferable because of a large effect of enhancing the storage stability of the latex.

The content of the nonionic surfactant is set in both of a deproteinizing step described hereinafter and a subsequent post-adding step so that the content of the nonionic surfactant can be adjusted within a range from 0.2 to 5.0% by weight based on the rubber component of the latex.

When the content of the nonionic surfactant is within the above range, it is more preferable to the effect of enhancing the storage stability of the latex and the effect of the cationic surfactant adsorbed in the rubber particles of the latex can be sufficiently maintained.

Use of those other than the surfactants described above, i.e. anionic and amphoteric surfactants, in the present invention exerts an action of eliminating the effect of the present invention obtained by adding the cationic surfactant. Accordingly, it is preferable that the cationic deproteinized natural rubber latex of the present invention substantially contains neither an anionic surfactant nor an amphoteric surfactant.

The cationic deproteinized natural rubber latex of the present invention of the present invention is preferably used as an adhesive for papers, fibers, cloths and hides, for example, as it is or after subjecting rubber molecules in the latex to a graft modification treatment.

Method of Preparing Cationic Deproteinized Natural Rubber Latex

The cationic deproteinized natural rubber latex of the present invention is prepared by passing through the following steps of:

(1) optionally diluting a natural rubber latex with water, adding a proteolytic enzyme and one or more cationic surfactants or one or more nonionic surfactants as a stabilizer, thereby to decompose a protein, followed by removal of a non-rubber component and further purification (deproteinizing step), and (2) incorporating, as a stabilizer, at least the surfactant which was not incorporated on the deproteinization treatment among the cationic surfactant and nonionic surfactant to a cream component concentrated by the purification treatment, and optionally adding an antioxidant (post-adding step), or by passing through the step of:

(1') optionally diluting a natural rubber latex with water, adding a proteolytic enzyme and one or more cationic surfactants and one or more nonionic surfactants as a stabilizer, thereby to decompose a protein, followed by removal of a non-rubber component and further purification (deproteinizing step).

In the deproteinizing steps (1) and (1') described above, the concentration of the rubber component is reduced by optionally diluting the natural rubber latex as a raw material with water, and then the natural rubber latex is matured by adding, the proteolytic enzyme, one or more cationic surfactants and/or one or more nonionic surfactants, whereby the deproteinizing treatment proceeds.

Since protein bonded or adsorbed to the rubber particles, thereby to stabilize them, is decomposed with this treatment to a low-molecular one, the treated protein is possible to be easily transferred to a water layer.

On the other hand, the surfactant is adsorbed to the rubber particles in place of the protein, thereby stabilizing the latex.

The concentration of the rubber component on deproteinization treatment is not specifically limited, but the rubber component is diluted to reduce the content within a range from 5 to 40% by weight, and preferably from 10 to 30% by weight, so as to exert the effect of the deproteinization treatment as possible.

The conditions of the deproteinization are not specifically limited, but the deproteinization treatment is usually conducted at a temperature within a range from 5 to 90° C., and preferably from 20 to 60° C., for about several minutes to one week.

In the removal of the non-rubber component and purification which are subsequently conducted after the deproteinization treatment, the latex is concentrated by centrifugation or ultrafiltration and the non-rubber component transferred in water such as protein decomposition product is removed to purify the latex.

In case the latex is concentrated by centrifugation, the latex is centrifuged at 5000 to 10000 rpm (centrifugal force at a gravity acceleration of about 9000 G) for about 1 to 60 minutes and a cream component obtained by concentrating the rubber component may be removed. In this case, the latex may be continuously separated by using a disc type centrifugal separator. The purification of the latex may be repeated, if necessary.

In the present invention, the step of further incorporating a surfactant to the cream component obtained by the purification, i.e. a rubber component of the deproteinized latex, is conducted.

In such a step, the nonionic surfactant may be incorporated when using the cationic surfactant alone in the deproteinizing step (1), while the cationic surfactant may be incorporated when using the nonionic surfactant alone in the deproteinizing step (1). When using the cationic surfactant in combination with the nonionic surfactant in the deproteinizing step, the cationic and/or nonionic surfactants can be post-added furthermore.

In any of the deproteinizing step (1) and post-adding step (2), the amount of the cationic surfactant and nonionic surfactant may be adjusted so that the content of the surfactant based on the rubber component of the latex respectively satisfies the range described above.

It is not necessary to incorporate the surfactant, which has already been incorporated in the deproteinizing step, in the post-adding step (2). However, since the content of the already-incorporated surfactant is commonly reduced after passing through the deproteinizing and purifying processes, the surfactant may be added again as far as the content based on the rubber component of the latex satisfies the range describe above.

The method of incorporating the surfactant in the post-adding step of the surfactant is not specifically limited, but an aqueous solution prepared by diluting the surfactant in a concentration of 10 to 20% by weight is preferably added while stirring the latex.

Treating Agent

The treating agent of the present invention is used in the preparation of the cationic deproteinized natural rubber of the present invention, and includes the followings:

a treating agent comprising a deproteinizing agent used in the deproteinizing step (1) and a post additive used in the post-adding step, and a treating agent used in the deproteinizing step (1').

Among the treating agents in the present invention, the treating agent comprising a deproteinizing agent and a post additive is further classified into two types:

(I) a treating agent comprising a deproteinizing agent containing at least a proteolytic enzyme and at least one cationic surfactant as an active component and a post additive containing at least one nonionic surfactant as an active component, and (II) a treating agent comprising a deproteinizing agent containing at least a proteolytic enzyme and at least one nonionic surfactant as an active component and a post additive containing at least one cationic surfactant as an active component.

According to the treating agent (I), since the deproteinizing agent contains the proteolytic enzyme, the protein in the natural rubber latex can be decomposed by using such a deproteinizing agent. Since the deproteinizing agent contains the cationic surfactant, the latex is subjected to a deproteinization treatment using a deproteinizing agent, thereby making it possible to provide the latex with the cationic properties and to stabilize the latex. Furthermore, since the post additive contains the nonionic surfactant, use of both the cationic and nonionic surfactants in combination can be realized in the post-adding step and the latex is further stabilized without impairing the cationic properties of the latex, thereby making it possible to exert excellent storage stability.

According to the treating agent (II), since the deproteinizing agent contains the proteolytic enzyme, the protein in the natural rubber latex can be decomposed by using such a deproteinizing agent. Since the deproteinizing agent contains the nonionic surfactant, the latex can be stabilized when the latex is subjected to a deproteinization treatment using a deproteinizing agent. Furthermore, since the post additive contains the cationic surfactant, the latex can be provided with the cationic properties and use of both the cationic and nonionic surfactants in combination can be realized in the post-adding step. Furthermore, the latex is further stabilized, thereby making it possible to exert excellent storage stability. Accordingly, there can be obtained a cationic deproteinized natural rubber latex which prevents an increase in viscosity during the storage even when using any of the treating agents described above, and which maintains the viscosity at 200 mPa·s or less even if the concentration of the rubber component is high such as 40 to 65% by weight.

Since the treating agent used in the deproteinizing step (1') described above contains the proteolytic enzyme, cationic surfactant and nonionic surfactant, such a treating agent makes it possible to deproteinize the natural rubber latex, to stabilize the latex on the deproteinization treatment and to provide the latex with the cationic properties, simultaneously.

The proteolytic enzyme, cationic surfactant and nonionic surfactant to be used in the treating agent of the present invention are the same as those described above.

The content of the proteolytic enzyme, cationic surfactant and nonionic surfactant in the treating agent of the present invention may be appropriately set so that the content of each component based on the rubber component in the latex satisfies the range described above when the treating agent is incorporating in the natural rubber latex.

EXAMPLES

The following Examples and Comparative Examples further illustrate the present invention.

Deproteinization Treatment of Natural Rubber Latex

Preparation Example 1

0.07 Parts by weight of alkali protease as a proteolytic enzyme and 50 parts by weight (stearyltrimethylammonium chloride content: 5.0% by weight) of an aqueous 10% solution of a cationic surfactant [manufactured by Kao Corp. under the trade name of "Quartamin 86w"] as an active component were incorporated in 167 parts by weight (rubber component: 100 parts by weight) of a high ammonia-preserved natural rubber latex containing a rubber component in a concentration of 60% by weight, and then 450 parts by weight of deionized water was added to prepare a latex with a total solid content TSC of 15% by weight. The stearyltrimethylammonium chloride content in the cationic surfactant was 5.0% by weight.

Then, the resulting latex was stirred at 30° C. for 24 hours thereby subjecting to a deprotenization treatment. Furthermore, the deproteinized latex was charged in a portable disc type centrifugal separator and subjected to a continuous centrifugation treatment at 5000 to 5500 rpm for 10 to 30 minutes, and then the resulting cream component was recovered.

Preparation Example 2

In the same manner as in Preparation Example 1, except that the amount of the cationic surfactant to be incorporated was changed to 40 parts by weight (stearyltrimethylammonium chloride content: 4.0% by weight) and the amount of deionized water to be added was changed to 460 parts by weight, a latex with TSC of 15% by weight was prepared.

In the same manner as in Preparation Example 1, the resulting latex was subjected to the deproteinization treatment and centrifugation treatment and a cream component was recovered.

Preparation Example 3

In the same manner as in Preparation Example 1, except that the amount of deionized water to be added was changed to 783 parts by weight, a natural rubber latex was prepared. The total solid content of the latex was 10% by weight.

In the same manner as in Preparation Example 1, the resulting latex was subjected to the deproteinization treatment and centrifugation treatment and a cream component was recovered.

Preparation Example 4

In the same manner as in Preparation Example 1, except that 20 parts by weight (polyoxyethylene nonyl phenyl ether content: 2.0% by weight) of an aqueous 10% solution of a nonionic surfactant [polyoxyethylene nonyl phenyl ether manufactured from Kao Corp. under the trade name of "Emulgen 920"] was incorporated in place of the cationic surfactant ["Quartamin 86W" manufactured by Kao Corp.] as an active component and the amount of deionized water to be added was changed to 813 parts by weight, a natural rubber latex was prepared. The total solid content of the latex was 10% by weight.

In the same manner as in Preparation Example 1, the resulting latex was subjected to the deproteinization treatment and centrifugation treatment and a cream component was recovered.

Comparative Preparation Example 1

In the same manner as in Preparation Example 1, except that 20 parts by weight (sodium polyoxyethylene lauryl sulfate content: 2.0% by weight) of an aqueous 10% solution of an anionic surfactant [sodium polyoxyethylene (2) lauryl ether sulfate manufactured from Kao Corp. under the trade name of "Emal E-70C"] was incorporated in place of the cationic surfactant ["Quartamin 86W" manufactured by Kao Corp.] as an active component and the amount of deionized water to be added was changed to 813 parts by weight, a natural rubber latex was prepared. The total solid content of the latex was 10% by weight.

In the same manner as in Preparation Example 1, the resulting latex was subjected to the deproteinization treatment and centrifugation treatment and a cream component was recovered.

The compositions of the respective Preparation Examples described above are shown in Table 1. The total solid content TSC was determined by accurately weighing about 1 g of the latex using a weighing bottle, drying the latex at 100° C. for about one hour, and measuring a dry weight (%) after cooling.

Preparation of Cationic Deproteinized Natural Rubber Latex

Example 1

The cream component obtained in Preparation Example 1 was diluted with deionized water to prepare a latex containing a rubber component in a concentration of about 50% by weight.

Then, an aqueous 10% solution of a nonionic surfactant (aforementioned trade name: "Emulgen 920") as an active component was incorporated in the latex. The amount was adjusted so that the content of polyoxyethylene nonyl phenyl ether is 1% by weight based on the rubber component of the latex.

Thus, a cationic deproteinized natural rubber latex with the total solid content TSC of 50% by weight was obtained.

Example 2

In the same manner as in Example 1, except that the cream component obtained in Preparation Example 2 was used, a cationic deproteinized natural rubber latex (TSC: 50% by weight) was prepared.

Example 3

In the same manner as in Example 1, except that the cream component obtained in Preparation Example 3 was used, a cationic deproteinized natural rubber latex (TSC: 50% by weight) was prepared.

Example 4

In the same manner as in Example 1, except that the cream component obtained in Preparation Example 4 was used, a latex containing a rubber component in a concentration of about 55% by weight was prepared.

Then, an aqueous 10% solution of a cationic surfactant (aforementioned trade name: "Quartamin 86W") as an active component was incorporated. The amount was adjusted so that the content of the stearyltrimethylammonium chloride is 3% by weight based on the rubber component of the latex).

Example 5

The cream component obtained in Preparation Example 2 was diluted with deionized water to prepare a latex containing a rubber component in a concentration of about 50% by weight.

TABLE 1

|  | Preparation Example 1 | Preparation Example 2 | Preparation Example 2 | Preparation Example 4 | Comparative Preparation Example 1 |
|---|---|---|---|---|---|
| Natural rubber latex | 167 (100) | 167 (100) | 167 (100) | 167 (100) | 167 (100) |
| Proteolytic enzyme | 0.07 | 0.07 | 0.07 | 0.07 | 0.07 |
| Surfactant |  |  |  |  |  |
| Quartamin 86W (Cationic) | 50 (5.0) | 40 (4.0) | 50 (5.0) | — | — |
| Emulgen 920 (Nonionic) | — | — | — | 20 (2.0) | — |
| Emal E-70C (Anionic) | — | — | — | — | 20 (2.0) |
| Deionized water | 450 | 460 | 783 | 813 | 813 |
| Total | 667.07 | 667.07 | 1000.07 | 1000.07 | 1000.07 |
| Total solid content TSC | 15% by weight | 15% by weight | 10% by weight | 10% by weight | 10% by weight |

*: Units other than that of TSC are parts by weight.
**: A numerical value in the parenthesis denotes a weight of a rubber component or a weight of an active Component of a surfactant.

Then, an aqueous 10% solution of a cationic surfactant (aforementioned trade name: "Quartamin 86W") as an active component and an aqueous 10% solution of a nonionic surfactant (aforementioned trade name: "Emulgen 920") as an active component were incorporated in the latex. The amount of "Quartamin 86W" as aforementioned trade name was adjusted so that the content of stearyltrimethylammonium chloride is 0.5% by weight based on the rubber component of the latex. The amount of "Emulgen 920" as aforementioned trade name was adjusted so that the content of polyoxyethylene nonyl phenyl ether is 1% by weight based on the rubber component of the latex.

Examples 6 to 9

The cream components obtained in Preparation Example 1 were diluted with deionized water to prepare latexes containing a rubber component in a concentration of about 50% by weight.

Then, the following nonionic surfactants were incorporated in the latexes, respectively.

aqueous 10% solution of nonionic surfactant manufactured by Kao Corp. under the trade name of "Rheodol TW-S120" [polyoxyethylene sorbitan monostearate, HLB: 14.9] (Example 6)

aqueous 10% solution of nonionic surfactant manufactured by Kao Corp. under the trade name of "Emulgen 109P" [polyoxyethylene lauryl ether, HLB: 13.6] (Example 7)

aqueous 10% solution of nonionic surfactant manufactured by Kao Corp. under the trade name of "Emulgen 320P" [polyoxyethylene stearyl ether, HLB: 13.9] (Example 8)

aqueous 10% solution of nonionic surfactant manufactured by Kao Corp. under the trade name of "Emulgen 430" [polyoxyethylene oleyl ether, HLB: 16.2] (Example 9)

The amount of the nonionic surfactant was adjusted so that the content of polyoxyethylene sorbitan monostearate, polyoxyethylene lauryl ether, polyoxyethylene stearyl ether or polyoxyethylene oleyl ether is 1% by weight based on the rubber component of the latex.

In such way, cationic deproteinized natural rubber latexes with the total solid content TSC of 50% by weight were obtained.

Comparative Examples 1 to 5

The cream components obtained in Preparation Examples 1 to 4 and Comparative Preparation Example 1 were diluted with deionized water thereby to adjust the concentration of the rubber component to 50% by weight (Comparative Examples 1 to 3), 55% by weight (Comparative Example 4) or 60% by weight (Comparative Example 5), respectively.

Comparative Example 6

The high ammonia-retaining natural rubber latex used in Preparation Example 1 was diluted with deionized water and, after reducing the concentration of the rubber component to 30% by weight, an aqueous 10% solution of a cationic surfactant (aforementioned trade name: "Quartamin 86W") as an active component was incorporated in the latex. The amount of "Quartamin 86W" as aforementioned trade name was adjusted so that the content of stearyltrimethylammonium chloride is 3% by weight based on the rubber component of the latex.

The compositions of the latexes in the Examples and Comparative Examples described above are shown in Tables 2 to 4 hereinafter. The total solid content TSC is the same as that described above.

Evaluation of Characteristics of Latex

With respect to the latexes obtained in the Examples and Comparative Examples described above, the following characteristics were evaluated.

(i) viscosity

With respect to the latex after one day has passed since the preparation, the viscosity was measured under the conditions of a #2 or #3 rotor, a rotating speed of 60 rpm and a temperature of 25° C. using a BM type viscometer and the resulting value was taken as an initial viscosity.

Also with respect to the latex after 30 days have passed since the preparation, the viscosity was measured in the same manner as described above.

(ii) Change in Appearance of Latex During Storage

The appearance of the latex after 30 days have passed since the preparation was visually observed and it was confirmed whether the separation between a cream component and serum occurred or not.

(iii) Nitrogen Content

According to the Kjeldahl method, the total amount of nitrogen in the latex solid content was determined. The values shown in Tables 2 and 3 are values wherein the nitrogen content based on nitrogen atoms in the surfactant was corrected.

(iv) Bonding Strength

According to the T type peel test described in JIS K 6854 "Procedure for Peel Strength Test of Adhesive", a bonding strength was measured when using first-grade cotton canvas cloth (JIS L 3102) as the adherend.

The measurement was conducted with respect to the latex (initial) and the latex after storage for 30 days, and the bonding strength was evaluated according to the following five-rank criteria.

5: very good bonding strength
4: good bonding strength
3: practically poor bonding strength
2: weak bonding strength
1: very weak bonding strength
(v) Workability on Coating A high-grade canvas cloth to be used in the bonding test was coated with the latex stored for 30days, and the workability on coating was evaluated from the workability and coated state of the latex according to the following criteria.

○: good workability, uniform coating
Δ: poor workability, unstable coated state
×: impossible to perform coating and judgment
The above results are shown in Tables 2 to 4.

TABLE 2

|  | Example 1 | Example 2 | Example 3 | Example 4 | Example 5 |
|---|---|---|---|---|---|
| [Composition of latex] | | | | | |
| Natural rubber latex | Preparation Example 1 (Cationic) | Preparation Example 2 (Cationic) | Preparation Example 3 (Cationic) | Preparation Example 4 (Nonioicy) | Preparation Example 2 (Cationic) |
| Surfactant to be post-added | | | | | |
| Quartamin 86W*1 (Cationic) | — | — | — | 1% by weight | 0.5% by weight |
| Emulgen 920*1 (Nonionic) | 1% by weight | 1% by weight | 1% by weight | — | 1% by weight |
| [Characteristics of latex] | | | | | |
| Total solid content TSC | 50% by weight | 50% by weight | 50% by weight | 55% by weight | 50% by weight |
| Viscosity η*2   Initial | 37 | 45 | 50 | 90 | 40 |
| After storage for 30 days | 40 | 50 | 55 | 95 | 45 |
| Bonding strength*3   Initial | 5 | 4 | 4.5 | 4 | 5 |
| After storage for 30 days | 5 | 4 | 4.5 | 4 | 5 |
| Workability on coating (After storage for 30 days) | ○ | ○ | ○ | ○ | ○ |
| Change in appearance of latex during storage | No change | No change | No change | No change | No change |
| Nitrogen content*4 | 0.04% by weight | 0.04% by weight | 0.03% by weight | 0.03% by weight | 0.04% by weight |

TABLE 3

|  | Example 6 | Example 7 | Example 8 | Example 9 |
|---|---|---|---|---|
| [Composition of latex] | | | | |
| Natural rubber latex | Preparation Example 1 (Cationic) | Preparation Example 1 (Cationic) | Preparation Example 1 (Cationic) | Preparation Example 1 (Cationic) |
| Surfactant to be post-added (Nonionic) | | | | |
| Rheodol-TW102*1 | 1% by weight | — | — | — |
| Emulgen 109*1 | — | 1% by weight | — | — |
| Emulgen 320P*1 | — | — | 1% by weight | — |
| Emulgen 430*1 | — | — | — | 1% by weight |
| [Characteristics of latex] | | | | |
| Total solid content TSC | 50% by weight | 50% by weight | 50% by weight | 50% by weight |
| Viscosity η*2   Initial | 37 | 37 | 37 | 37 |
| After storage for 30 days | 50 | 75 | 70 | 50 |
| Bonding strength*3   Initial | 5 | 5 | 5 | 5 |
| After storage for 30 days | 5 | 4.5 | 4.5 | 5 |
| Workability on coating (After storage for 30 days) | ○ | ○ | ○ | ○ |
| Change in appearance of latex during storage | No change | No change | No change | No change |
| Nitrogen content*4 | 0.04% by weight | 0.04% by weight | 0.03% by weight | 0.04% by weight |

TABLE 4

|  | Comparative Example 1 | Comparative Example 2 | Comparative Example 3 | Comparative Example 4 | Comparative Example 5 | Comparative Example 6 |
|---|---|---|---|---|---|---|
| [Composition of latex] | | | | | | |
| Natural rubber latex | Preparation Example 1 (Cationic) | Preparation Example 2 (Cationic) | Preparation Example 3 (Cationic) | Preparation Example 3 (Nonionic) | Comp. Preparation Example 1 (Anionic) | —* |
| Surfactant to be post-added | | | | | | |
| Quartamin 86W*1 (Cationic) | — | — | — | — | — | (3% by weight) |
| Emulgen 920*1 (Nonionic) | — | — | — | — | — | — |
| [Characteristics of latex] | | | | | | |
| Total solid content TSC | 50% by weight | 50% by weight | 50% by weight | 55% by weight | 60% by weight | 28% by weight |
| Viscosity η*2    Initial | 50 | 60 | 60 | 90 | 70 | (30) |
| After storage for 30 days | 300 | 350 | 400 | 92 | 72 | — |
| Bonding strength*3    Initial | 5 | 4 | 4.5 | 2 | 1 | 3 |
| After storage for 30 days | 3.5 | 2.5 | 3.0 | 2 | 1 | — |
| Workability on coating (After storage for 30 days) | Δ | Δ | Δ | ◯ | ◯ | X |
| Change in appearance of latex during storage | No change | No change | No change | No change | No change | Tendency of separation |
| Nitrogen content*4 | 0.04% by weight | 0.04% by weight | 0.03% by weight | 0.03% by weight | 0.03% by weight | 0.35% by weight |

The reference symbols *1 to *4 in Tables 2 to 4 are as follows.
*1: It denotes a weight percentage based on the rubber component in the latex.
*2: Unit is [mPa·s].
*3: It denotes an average value as a result of evaluation according to five-rank criteria.
*4: It denotes a weight percentage based on the rubber solid content.

As is apparent from Tables 2 to 4, the latexes using a cationic surfactant in combination with a nonionic surfactant of Examples 1 to 5 prevent an increase in viscosity with a lapse of time regardless of high concentration (40% by weight or more) of the rubber component and had good storage stability and excellent adhesion to cloths.

To the contrary, regarding the latexes containing a cationic surfactant alone of Comparative Examples 1 to 3, the viscosity after a lapse of 30 days increased to 200 mPa·s or more because of poor storage stability, thus lowering workability on coating and bonding strength. Also there were problems that an increase in viscosity with a lapse of time is large and scatter in the thickness is liable to occur in case of coating with the latex.

The latex containing a cationic surfactant alone of Comparative Example 4 and the latex containing an anionic surfactant alone of Comparative Example 5 had poor bonding strength.

Regarding the latex of Comparative Example 6 wherein only a cationic surfactant was incorporated in a non-deproteinized natural rubber latex, the storage stability is drastically inferior and a cream component and serum were separated with each other after a lapse of 30 days. An initial bonding strength was poor because of low concentration of the rubber component.

As described above, according to the present invention, there can be obtained a cationic deproteinized natural rubber latex which has good storage stability and exhibits excellent adhesion to papers, fibers, cloths and hides.

The disclosure of Japanese Patent Application No.11-257562, filed on Sep. 10, 1999, is incorporated herein by reference.

What is claimed is:

1. A cationic deproteinized natural rubber latex, in which rubber particles are positively charged in the presence of nonionic surfactant and the concentration of said rubber particles is from 40 to 65% by weight and in which the viscosity at 25° C. of said latex is 200 mPa·s or less.

2. The cationic deproteinized natural rubber latex according to claim 1, which is prepared by subjecting the natural rubber latex to a deproteinization treatment using a proteolytic enzyme and one or more surfactants selected from cationic and nonionic surfactants and which contains both cationic and nonionic surfactants after the treatment.

3. The cationic deproteinized natural rubber latex according to claim 1, which is prepared by subjecting a natural rubber latex to a deproteinization treatment using a proteolytic enzyme and one or more surfactants selected from cationic and nonionic surfactants, concentrating the deproteinized latex so that the concentration of the rubber component in the latex is within a range from 40 to 65% by weight, and incorporating at least the surfactant which was not incorporated on the deproteinization treatment among the cationic surfactant and nonionic surfactant.

4. The cationic deproteinized natural rubber latex, according to claim 1, which is prepared by treating the latex with a deproteinizing agent containing at least a proteolytic enzyme and one or more cationic surfactants as an active component, and an additive containing at least one or more nonionic surfactants as an active component which is added after treatment according to said deproteinizing agent.

5. The cationic deproteinized natural rubber latex, according to claim 1, which is prepared by treating the latex with at least a proteolytic enzyme and one or more nonionic surfactants as an active component, and an additive containing at least one or more cationic surfactants as an active component which is added after treatment according to said deproteinizing agent.

6. The cationic deproteinized natural rubber latex, according to claim 1, which is prepared by treating the latex with at least a proteolytic enzyme, one or more cationic surfactants and one or more nonionic surfactants as an active component.

* * * * *